(12) United States Patent
Kanjlia et al.

(10) Patent No.: US 10,354,237 B2
(45) Date of Patent: Jul. 16, 2019

(54) SYSTEMS AND METHODS FOR EFFECTING PERSONAL PAYMENT TRANSACTIONS

(71) Applicants: Gagan Kanjlia, Ashburn, VA (US); Scott Zimmer, Charlotte, NC (US); Alexander S. Wilson, Kennett Square, PA (US); Vishal Puri, Ashburn, VA (US); Jay F. Pober, Cherry Hill, NJ (US)

(72) Inventors: Gagan Kanjlia, Ashburn, VA (US); Scott Zimmer, Charlotte, NC (US); Robert J. Larson, Havertown, PA (US); Alexander S. Wilson, Kennett Square, PA (US); Vishal Puri, Ashburn, VA (US); Jay F. Pober, Cherry Hill, NJ (US)

(73) Assignee: CAPITAL ONE SERVICES LLC, McLean, VA (US)

( * ) Notice: Subject to any disclaimer, the term of this patent is extended or adjusted under 35 U.S.C. 154(b) by 0 days.

(21) Appl. No.: 14/108,926

(22) Filed: Dec. 17, 2013

(65) Prior Publication Data

US 2014/0172694 A1 Jun. 19, 2014

Related U.S. Application Data

(60) Provisional application No. 61/738,104, filed on Dec. 17, 2012.

(51) Int. Cl.
*G06Q 20/10* (2012.01)
(52) U.S. Cl.
CPC .................................. *G06Q 20/10* (2013.01)
(58) Field of Classification Search
CPC ............................. G06Q 20/10; Y10S 902/00
(Continued)

(56) References Cited

U.S. PATENT DOCUMENTS 6,311,170 B1 * 10/2001 Embrey ................. G06Q 20/02
705/39
8,121,945 B2 2/2012 Rackley et al.
(Continued)

FOREIGN PATENT DOCUMENTS

WO WO 2006/106495 4/2005

OTHER PUBLICATIONS

"Donner Jonathan, Tellez Camilo Andres, Mobile banking and economic development: linking adoption, impact, and use, Nov. 13, 2008, Asian Journal of Communication vol. 18" (Year: 2008).*

(Continued)

*Primary Examiner* — Eric T Wong
*Assistant Examiner* — Kevin T Poe
(74) *Attorney, Agent, or Firm* — Finnegan, Henderson, Farabow, Garrett & Dunner LLP (57) ABSTRACT

Systems, processes, and computer programs are disclosed for facilitating personal payment transactions. In certain embodiments, disclosed embodiments may provide an interface dialog engine for providing a dynamic and customized interface for effecting the personal payment transaction and a funding source engine for providing options to fund the payment. The disclosed embodiments may also provide a payee identity engine for identifying the intended payee receiving the payment and a routing option engine for providing options to route the payment. The embodiments may also provide a messaging engine for providing channels for related parties to the personal payment transaction to communicate.

12 Claims, 9 Drawing Sheets

(58) Field of Classification Search
USPC .................................................... 705/4, 39
See application file for complete search history.

(56) References Cited

U.S. PATENT DOCUMENTS

| | | | | |
|---|---|---|---|---|
| 8,473,421 B2* | 6/2013 | Scalisi | ............... | G06Q 20/10 705/319 |
| 2001/0032154 A1* | 10/2001 | Schummer | ............ | G06Q 30/06 705/30 |
| 2003/0217892 A1* | 11/2003 | Persky | .................. | A47F 9/048 186/68 |
| 2003/0220873 A1* | 11/2003 | Wagner et al. | ................ | 705/40 |
| 2006/0167819 A1* | 7/2006 | Bhambri et al. | ............... | 705/64 |
| 2008/0046823 A1* | 2/2008 | Korbin | ................. | G06Q 40/02 715/733 |
| 2008/0177661 A1* | 7/2008 | Mehra | .................. | G06Q 20/10 705/44 |
| 2008/0262964 A1* | 10/2008 | Bezos | ................... | G06Q 20/00 705/39 |
| 2010/0100426 A1* | 4/2010 | Sander | ................. | G06Q 10/0633 705/7.27 |
| 2010/0138341 A1* | 6/2010 | Solomon | ............. | G06Q 20/108 705/42 |
| 2010/0205065 A1* | 8/2010 | Kumar | ................... | G06F 9/547 705/26.1 |
| 2012/0030583 A1* | 2/2012 | DiPietro | .............. | G06F 3/0416 715/745 |
| 2012/0215648 A1* | 8/2012 | Rose et al. | ...................... | 705/16 |
| 2012/0259781 A1* | 10/2012 | Fote | ....................... | G06Q 20/12 705/44 |
| 2012/0323783 A1* | 12/2012 | Canetto | .......................... | 705/44 |
| 2013/0054417 A1* | 2/2013 | O'Donoghue | ......... | G06Q 20/02 705/26.43 |
| 2013/0060689 A1 | 3/2013 | Oskolkov et al. | | |
| 2013/0060708 A1* | 3/2013 | Oskolkov | ............. | G06Q 20/10 705/75 |
| 2013/0166332 A1 | 6/2013 | Hammad | | |
| 2014/0067656 A1* | 3/2014 | Cohen Ganor | ........ | G06Q 50/01 705/39 |
| 2015/0371209 A1* | 12/2015 | Owen | ................... | G06Q 20/10 705/44 |

OTHER PUBLICATIONS

"Ball Thomas, Sisl: Several Interfaces, Single Logic, 2000, International Journal of Speech Technology 3, 93-108" (Year: 2000).*
Chou David, Chou Amy, The E-Commerce Revolution a Guide to the Internet Revolution in Banking, 2000, Information Systems Management (Year: 2000).*

* cited by examiner

SYSTEMS AND METHODS FOR EFFECTING PERSONAL PAYMENT TRANSACTIONS

PRIORITY CLAIM

This disclosure claims priority under 35 U.S.C. § 119 to U.S. provisional patent application No. 61/738,104, filed on Dec. 17, 2012, and entitled "Systems and Methods for Effecting Personal Payment Transactions," which is incorporated herein by reference in its entirety.

FIELD

The disclosed embodiments generally relate to personal payment systems, and more particularly, to systems, processes, and computer programs for facilitating users to effect personal payment transactions.

Electronic personal payment transactions, such as person-to-person payment and person-to-business payment, represent a rapidly growing industry. Current personal payment systems, however, are often inflexible and inconvenient. There is no payment gateway where money movement may be completed through a singular portal irrespective of payment medium. For example, a payee may have to create an account with a financial service provider in order to collect the payment delivered by that financial service provider. Another example of the inflexibility of existing personal payment systems is the lack of customization with respect to sending and receiving payment. For example, current systems do not provide mechanisms to aid and facilitate decisions surrounding the potential routing of payments for both generic and specific types of payments.

Lack of flexible and distinct payment channels may cause the user to research different payment platforms. This may also require the user to look up information, and make complex multiple parameter evaluations with regards to overall functionality of a given transaction. Moreover, the payer is offered no flexibility or optionality with regards to the sourcing of the funds. In addition, the payee is usually not offered options as to how the payment should be received, and consequently, the payee has no influence over the cost, the speed, and the stability of the payment route.

Furthermore, existing personal payment systems may cause users inconvenience due to the lack of mechanisms that could minimize the efforts of the payer to initiate or complete a payment transaction. Examples of these inconveniences may include, for example, the payer may have to spend a considerable amount of time to set up an account to effect a transaction; the payer may have to manually look up the payee's information, for example, the payee's bank account number, in order to set up and complete a transaction; the payer and the payee may not freely choose a payment rail; and the payee may not be able to withdraw the payment immediately if the payee receives a check that deposited into his bank account.

Moreover, existing personal payment systems are built around the system provider needs rather than the needs or desires of their users. Current systems thus focus on merely effecting the payment itself, with limited additional interaction with the users. Current systems also provide limited mechanisms for a payee to initiate a payment transaction.

Furthermore, existing personal payment systems have limited functionality to facilitate group or crowd payments/collections. Existing personal payment systems also lack mechanisms that, for example, to provide feedback to users with respect to the status of payments or how they were received.

Thus, existing personal payment systems are limited, inflexible, inconvenient, and not personalized.

SUMMARY

The accompanying drawings, which are incorporated in and constitute a part of this specification, illustrate various embodiments and aspects of the disclosed embodiments, and together with the description, serve to explain the principles of the disclosed embodiments.

Disclosed embodiments include systems, methods and computer programs for enabling a user to easily and accurately complete personal payment transactions using a variety of payment options. Disclosed embodiments also include mechanisms for generating a dynamic and customized interface for a payer to effect a personal payment transaction, receive some identifying information about a payee from the payer via the customized user interaction, provide suggested recipients to the payer for identifying the payee based on the identifying information received from the payer, provide funding options associated with the personal payment transaction to the payer, provide routing options to the payer and/or the payee for routing the payment associated with the personal payment transaction, and provide channels for the payer and the payee to communicate.

Consistent with some disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

DESCRIPTION OF THE EMBODIMENTS

It is to be understood that the following detailed description is exemplary and explanatory only and is not restrictive of disclosed embodiments. For example, steps or processes disclosed herein are not limited to being performed in the order described, but may be performed in any order, and that some steps may be omitted, consistent with the disclosed embodiments.

Reference will now be made in detail to exemplary embodiments, examples of which are illustrated in the accompanying drawings and disclosed herein. Wherever convenient, the same reference numbers may be used in the drawings and the following description to refer to the same or similar parts. Also, similarly named elements may perform similar functions and may be similarly designed. Numerous details are set forth to provide an understanding of the embodiments described herein. In some cases, the embodiments may be practiced without these details. In other instances, well-known techniques and/or components may not be described in detail to avoid obscuring described embodiments. While several exemplary embodiments and features are described herein, modifications, adaptations, and other implementations may be possible, without departing from the spirit and scope of the disclosure. Accordingly, the following detailed description does not limit the disclosure. Instead, the proper scope of the disclosure is defined by the appended claims.

Figure 1:
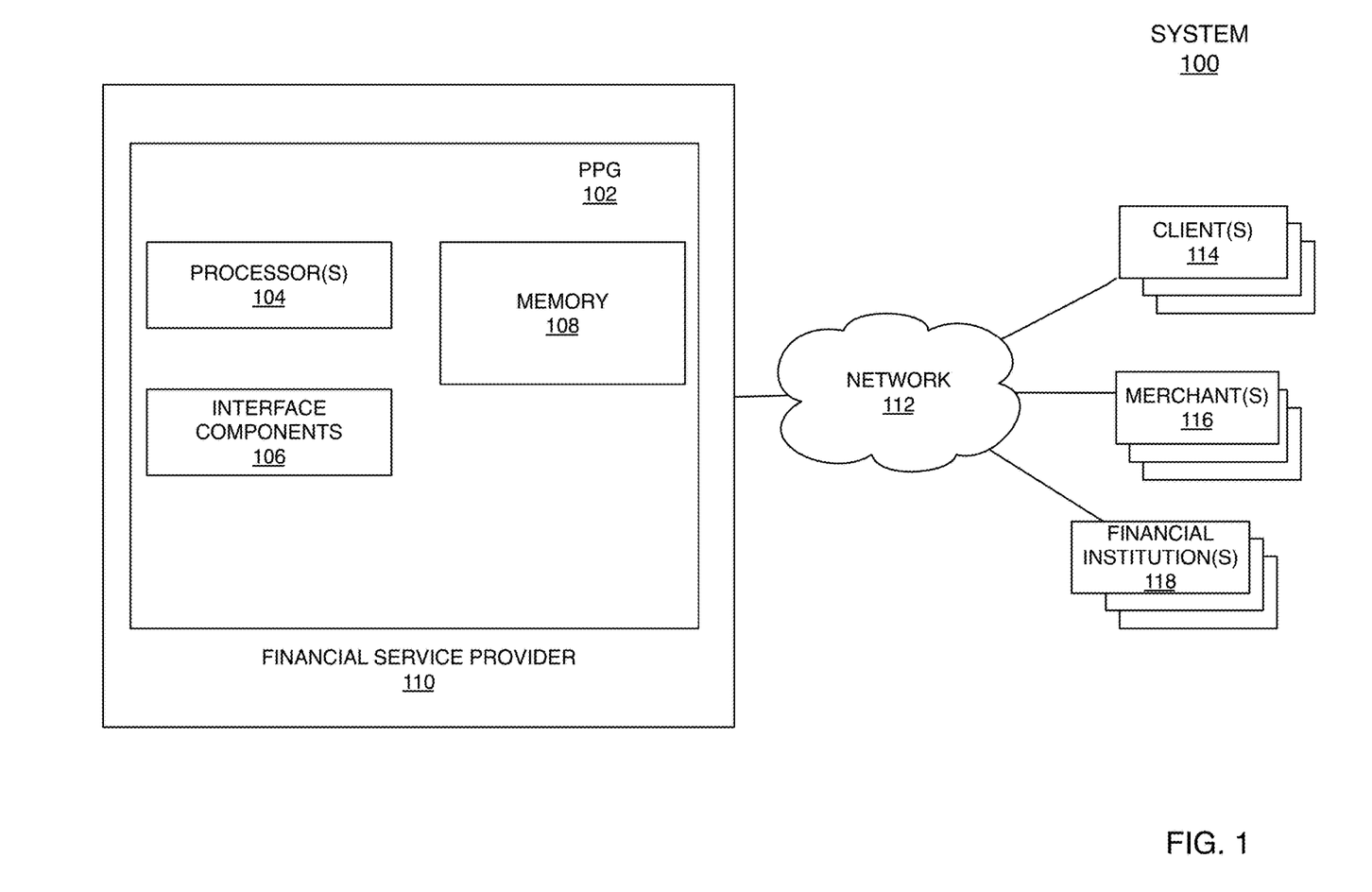
FIG. 1 is diagram of an exemplary system that may be used to implement disclosed embodiments.

FIG. 1 shows an exemplary system configured to execute one or more software processes that, when executed, provide one or more aspects of the disclosed embodiments. The components and arrangement shown in FIG. 1 are not intended to be limiting to the disclosed embodiment as the components used to implement the processes and features disclosed here may vary.

In accordance with disclosed embodiments, system 100 may include financial service provider 110, Personal Payment Genie 102, network 112, one or more clients 114, one or more merchants 116, and one or more financial institutions 118. System 100 may include other components to provide, collect, process, and transmit information consistent with the disclosed embodiments.

Personal Payment Genie ("PPG") 102 may be a computer-based system including computer system components, such as one or more servers, desktop computers, workstations, tablets, hand held computing devices, memory devices, and/or internal network(s) connecting the components. In some embodiments, PPG 102 may be a server that includes one or more processor(s) 104, memory devices, such as memory 108, and interface components 106. PPG 102 may be a single server or may be configured as a distributed computer system including multiple servers or computers that interoperate to perform one or more of the processes and functionalities associated with the disclosed embodiments. In certain embodiments, PPG 102 may be a server that is associated with financial service provider 110. Financial service provider 110 may represent, for example, a bank, a merchant, a credit card provider, or any other entity that provides financial services to customers. In one aspect, financial service provider 110 may be an institution or an individual that collects and processes personal payment for certain transactions, and transfers the personal payment to one or more intended payees.

Processor(s) 104 may be one or more known processing devices, such as a microprocessor from the Pentium™ family manufactured by Intel™ or the Turion™ family manufactured by AMD™. Processor(s) 104 may include a single core or multiple core processor system that provides the ability to perform parallel processes simultaneously. For example, processor(s) 104 may be a single core processor that is configured with virtual processing technologies known to those skilled in the art. In certain embodiments, processor(s) 104 may use logical processors to simultaneously execute and control multiple processes. Processor(s) 104 may implement virtual machine technologies, or other similar known technologies to provide the ability to execute, control, run, manipulate, store, etc. multiple software processes, applications, programs, etc. In another embodiment, processor(s) 104 may include a multiple-core processor arrangement (e.g., dual or quad core) that is configured to provide parallel processing functionalities to allow PPG 102 to execute multiple processes simultaneously. One of ordinary skill in the art would understand that other types of processor arrangements could be implemented that provide for the capabilities disclosed herein.

PPG 102 may also include one or more storage devices configured to store instructions used by processor(s) 104 (or other components) to perform certain functions related to the disclosed embodiments. In one example, PPG 102 may include memory 108 that includes instructions to enable processor(s) 104 to execute one or more applications, such as server applications, network communication processes, or any other type of application or software available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium. PPG 102 may be PPG 202, depicted in FIG. 2 and discussed below.

Methods, systems, and computer programs consistent with the disclosed embodiments are not limited to separate programs or computers configured to perform dedicated tasks. For example, PPG 102 may include a memory that may include one or more programs to perform one or more functions for multiple user display control. Moreover, processor(s) 104 may execute one or more programs located remotely from system 100. For example, system 100 may access one or more remote programs, that, when executed, perform functions related to disclosed embodiments. Memory 108 may include one or more memory devices that store data and instructions used to perform one or more features of the disclosed embodiments. Memory 108 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

PPG 102 may also be communicatively connected to one or more memory devices (e.g., databases (not shown)) locally or through a network. The remote memory devices may be configured to store information and may be accessed and/or managed by PPG 102. By way of example, the remote memory devices may be document management systems, Microsoft SQL database. SharePoint databases, Oracle™ databases, Sybase™ databases, or other relational databases. Systems, processes, computer programs, and tangible computer-readable medium of disclosed embodiments, however, are not limited to separate databases or even to the use of a database.

PPG 102 may also include one or more I/O devices that may comprise one or more interfaces for receiving signals or input from input devices and providing signals or output to one or more output devices that allow data to be received and/or transmitted by PPG 102. For example, PPG 102 may include interface components 106 that may provide interfaces to one or more input devices, such as one or more keyboards, mouse devices, and the like, that enable PPG to receive data from one or more users such as client(s) 114.

Furthermore, interface components 106 may include components configured to send and receive information between components of PPG 102 or external to PPG 102, such as network 112.

Network 112 may be any type of network that provides communications, exchanges information, and/or facilitates the exchange of information between PPG 102 and client(s) 114. In one embodiment, network 112 may be the Internet, a Local Area Network, or other suitable connection(s) that enables system 100 to send and receive information between the components of system 100.

Client(s) 114 may be one or more computer systems. For example, client(s) 114 may include a general purpose or notebook computer, a mobile device with computing ability, a server, a desktop computer, tablet, or any combination of these computers and/or affiliated components. For example, client(s) 114 may be a smartphone, consistent with the disclosed embodiments. In some embodiments, each client may be a computer system or device that is operated by a user who is a customer or a potential customer of financial service provider 110. Client(s) 114 may be configured with storage that stores one or more operating systems that perform known operating system functions when executed by one or more processors. By way of example, the operating systems may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system. Client(s) 114 may also include communication software that, when executed by a processor, provides communications with network 112, such as Web browser software, tablet or smart hand held device networking software, etc.

Merchant(s) 116 may include systems operated by, for example, online retailers, brick-and-mortar retailers, or the like. Merchant(s) 116 may be communicatively connected to other devices of system 100 through, for example, network 112 or direct connection. Merchant(s) 116 may receive and send payments consistent with disclosed embodiments.

Financial Institution(s) 118 ("FI") may include systems operated by, for example, financial institutions other than financial service provider 110 (i.e. those not affiliated with or part of the institution operating financial service provider 110). FI 118 may be communicatively connected to other devices of system 100 via, for example, network 112 or direct connection. For example, FI 118 may be operated by a bank, a credit union, a banking cooperative, or the like. FI 118 may receive and send payments consistent with disclosed embodiments.

Figure 2:
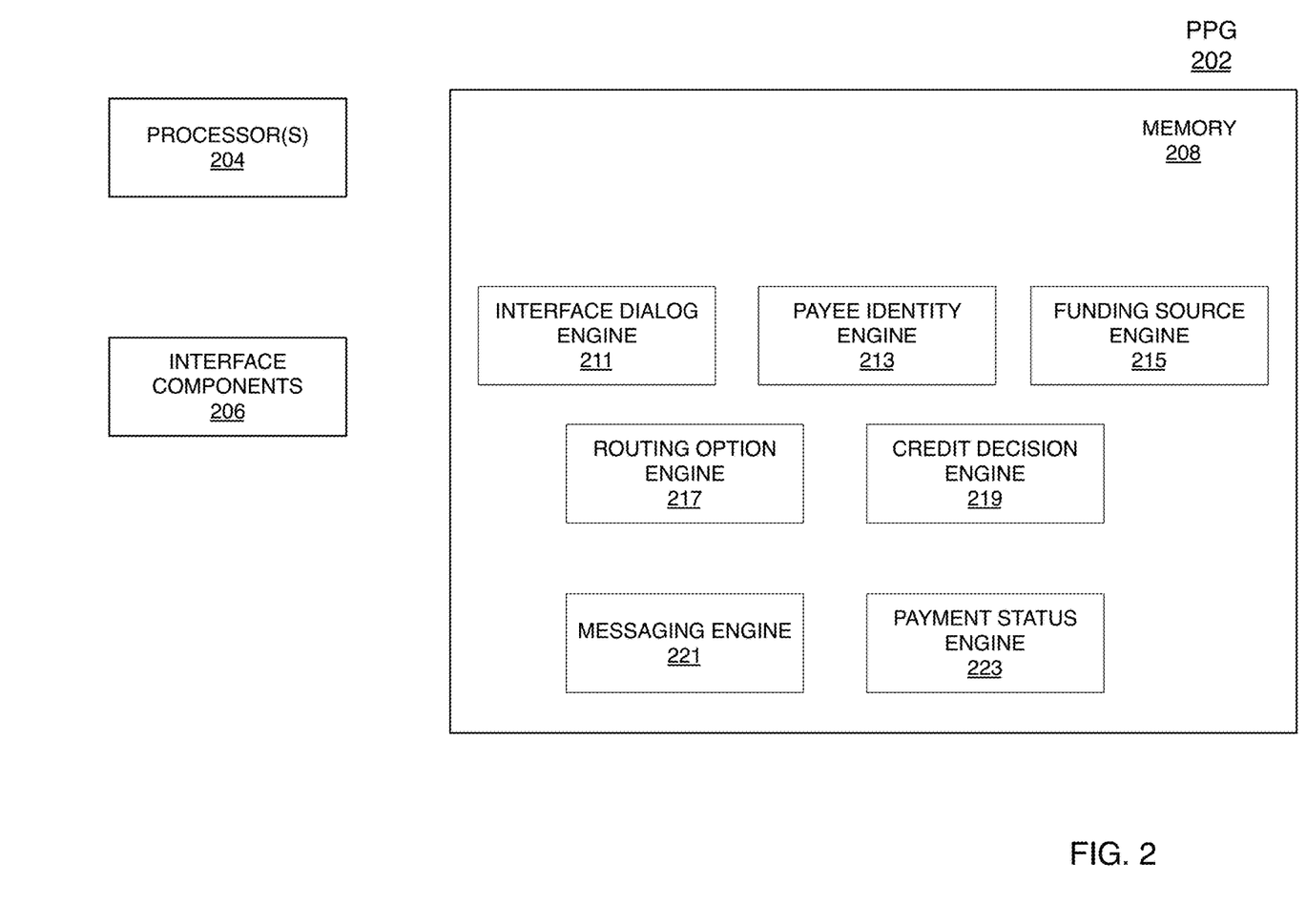
FIG. 2 is a diagram of some exemplary engines for implementing certain aspects of disclosed embodiments.

FIG. 2 illustrates a number of engines that may be, in some embodiments, used to implement disclosed embodiments. The disclosed "engines" (also known as "modules") may be implemented in software, hardware, firmware, a mix of any of those, or the like. Processor 204, Interface Components 206, and Memory 208 may be utilized to perform processes to implement and facilitate the operation of the illustrated engines in FIG. 2. These engines may include software, hardware, or firmware instructions (or a combination thereof) executable by one or more processors, such as processor(s) 204, alone or in various combinations with other engines disclosed in this or other embodiments.

To provide a natural and intuitive interaction to effect the payment transaction, in some embodiments, interface dialog engine 211 may be configured to dynamically determine an appropriate user interface for a particular user of PPG 202.

In some aspects, interface dialog engine 211 may determine the appropriate interaction mechanisms that PPG 202 may utilize while interacting with this particular user, based on the user's preference or available user profiles. For example, based on a user's information including, for example, transaction history, profile, demographic information, behavior, user's input provided to interface dialog engine 211 for setting up the interface, or information from social networking sites, etc., interface dialog engine 211 may customize a personalized user interface that this user is most likely receptive to (e.g. if a user likes to do everything by sending a message on Facebook®, some aspects of the disclosed embodiments may be performed via messaging using Facebook®). In another example, if a user is technologically experienced, interface dialog engine 211 may determine whether the user interface for this user will have a different look and feel than a user interface for another user who is less technologically experienced. In some embodiments, if a user is determined to be technically experienced, interface dialog engine 211 may be configured to provide more products and functions associated with the payment transaction; whereas for a user who is determined to be less technically experienced, interface dialog engine 211 may be configured to provide basic and less complex processes associated with the payment transaction. In other embodiments, if a user is young and/or a regular user of PPG 202, interface dialog engine 211 may be configured to provide a playful and colorful user interaction; whereas for a user who uses PPG 202 less frequently, interface dialog engine 211 may be configured to provide a user interaction having more user instructions and functional layout. Interface dialog engine 211 may also be configured to present different visual content (e.g., pictures, colors, and the like) to different users.

Additionally or alternatively, interface dialog engine 211 may be configured to provide mechanisms that allow the user to interact with PPG 202 via a voice-controlled input. For example, if a particular user prefers to input data via voice instead of typing, interface dialog engine 211 may be configured to collect data required for a given transaction via the voice-controlled input. In some aspects, if the voice-controlled input is initiated, interface dialog engine 211 may further be configured to provide mechanisms to test whether PPG 202 could accurately recognize and understand this user's voice. In other aspects, interface dialog engine 211 may request the user to confirm the information collected via the voice-controlled input to ensure accuracy.

To minimize the payer's efforts of providing information relating to the payment transaction, based on the payer's input of one or more pieces information about his/her intended payee (e.g., the payee's name), payee identity engine 213 may be configured to provide one or more suggested recipients that could potentially be the payee of the payment transaction. Information about the payee may be provided in the form of voice, typing, token, shortlisted entry, or the like. In some embodiments, payee identity engine 213 may be configured to provide the suggested recipients of the payment by using phone contacts, electronic mail contact lists, social networking sites, website user accounts, Whitepages™, checking account profile information, or any other sources.

To better assist the payer to identify the payee and ensure accuracy, in some embodiments, payee identity engine 213 may be configured to estimate a level of confidence with respect to the identity of the intended payee, and provide an ordered list of the suggested recipients based on the level of confidence. For example, once the payer provides the name and/or other information about the intended payee, payee identity engine 213 may be configured to determine the confidence level for each of the suggested recipients, where the confidence level indicates the perceived likelihood that the suggested recipient(s) is the person that the payer intends to send the payment. The confidence level may increase if multiple independent data sources are utilized to suggest recipients of the payment. In some embodiments, payee identity engine 213 may be configured to consider one or more of the following factors to estimate the level of confidence: payment and/or other user history; the quality of the data source; probability of coincidence; the form of payment; the proximity between the payer and the intended payee(s); physical presence of the payer and/or the intended payee(s); and any other factors.

To ensure accuracy, payee identity engine 213 may be configured to provide mechanisms for the payer to confirm the identity of the payee. In some aspects, payee identity engine 213 may be configured to provide sensory confirmation, such as vibrating or sound, to reflect the degree of confidence of the candidate payee(s). In other aspects, payee identity engine 213 may also be configured to interact with interface design engine (not shown) to display, via the customized user interface for the payer, additional information about the suggested recipients (e.g., photos, addresses, phone numbers, ages), the confidence level, and data sources used to suggest recipients.

To provide a flexible way to fund the payer's payment, PPG 202 may execute instructions to provide the payer with one or more funding options associated with the payment transaction. In some embodiments, funding source engine 215 may be configured to determine available funding sources to fund the payment. The available funding source may be internal or external to financial service provider 110. For example, in some embodiments, a payer wishing to transfer money to another person may not need to have an existing account (or open a new account) with financial service provider 110 in order to fund his/her payment. In other embodiments, funding source engine 215 may be configured to consider multiple factors to determine which funding source(s) is the payer's preference, and accordingly suggest this routing option(s) to the payer. For example, to determine the payer's preferred funding sources, funding source engine 215 may consider factors including, for instance, account transaction history, time, costs, linked accounts/sources, available balance, available credit, pending transactions (both credit and debit), etc. In some embodiments, a plurality of funding sources may be employed to fund one payment transaction.

To add more flexibility to sending and receiving payments, PPG 202 may be configured to execute instructions to provide mechanisms for the payer and/or the payee to choose one or more routing options to "rail" the payment. In some embodiments, routing option engine 217 may be configured to suggest routing options to the payee (same or similar mechanisms may also be provided to the payer consistent with the disclosed embodiments). In some aspects, routing option engine 217 may consider the following data to make routing suggestions: type of payment; available information of the payee; locale of the payee; feedback and/or ranking of routes used in the past; historical behavior, such as, for example, route chosen in the past; and other data.

In some embodiments, routing option engine 217 may be configured to determine which payment rail or rails represent the best fit for the payment, and suggest this payment rail(s) to the payee accordingly. In some embodiments, routing option engine 217 may be configured to rank the suggested payment rails by multiple parameters including, for instance, history, safety, speed, cost, stability, and the like. Additionally or alternatively, the payee may enter his/her preferred routing option for receiving the incoming payment if his/her preferred routing option is not included in the suggested options. The payee's choice of the routing option may be fed back to routing option engine 217 for making future suggestions. In some aspects, the payee may choose one or more routing options to receive the incoming payment. In other aspects, routing option engine 217 may be configured to prevent the payee from receiving funds twice via different payment rails.

For certain routing rails provided or chosen by the payer and/or the payee, the payment may not be delivered immediately. Thus, in some embodiments, credit decision engine 219 may be configured to speed up the availability of funds for receiving the payment. For example, if a payment rail provided or chosen by the payee involves a wait time or clearing period, credit decision engine 219 may be configured to determine the payee's willingness to accept additional cost of expedited payment rails, for example, making the payment via wire transfers. Credit decision engine 219 may also be configured to determine the payee's eligibility for credit advance in order to speed up the availability of funds. Once credit decision engine 219 determines that the payee is willing and eligible for credit advance, it may be configured to provide mechanisms that allow the payee to apply for credit advance.

Once the payee receives the payment, PPG 202 may execute instructions to provide the payee with some allocation options to redirect the received payment and guide the payee to complete the allocation. Examples of allocation options may include, for example, putting payment towards phone bill, buying a pastry at a nearby bakery, buying candy bars for some children in the same store as the payee, buying items that are on the payee's wish list at online stores, etc. In some embodiments, PPG 202 may execute instructions to perform functions relating to determining these suggested allocation options based on information obtained from, for example, the payee's profile, transaction history, social networking sites, and the like. In other embodiments, the suggested allocation options may be determined based on the payee's location, which may be, for example, a restaurant, a bar, and a store.

To provide a more natural, intuitive, interactive, and flexible payment system, and add more fun to the payment transaction, PPG 202 may execute instructions to perform messaging functions at some or all steps of the payment transaction. In some embodiments, messaging engine 221 may be configured to select an appropriate channel of communication for the payer and the payee (or some other parties associated with the payment transaction). Channels of communication may include, for example, text messaging, email, social networking sites, or the like. In some embodiments, messaging engine 221 may be configured to take into account the payee's preferences in determining which channels of communication to provide. For example, if messaging engine 221 determines that the text message is the most effective or preferred way of communication for the payee, whereas the payer prefers to use emails, messaging engine 221 may translate text messages into email message for the payer, and vice versa. Messaging engine 221 may determine the most effective or preferred way of communication based on factors including, for example, information taken from email accounts, customer history, cell phone, social networking sites, and the like.

In some embodiments, messaging engine 221 may be configured to determine the content of messages displayed to related parties associated with the payment transaction (e.g. the payer, the payee, and other third parties). In some aspects, messaging engine 221 may be configured to collect, obtain, request, and consider information such as, for example, the type of payment, the occasion of the payment, the payment triggering party, static input (e.g., the user's input provided to interface dialog engine 211 for setting up the interface, or pre-filled information provided by PPG 202 via interface dialog engine 211 accepted by the user, or rules and regulations relating to the restrictions for sending commercial messages), and behavioral inputs (e.g., historical use or receptiveness to certain messages), and the like, to determine the content of messages. In other aspects, messaging engine 221 may also consider the occasion of payment in determining the content of the message to be displayed to the related parties.

Figure 6:
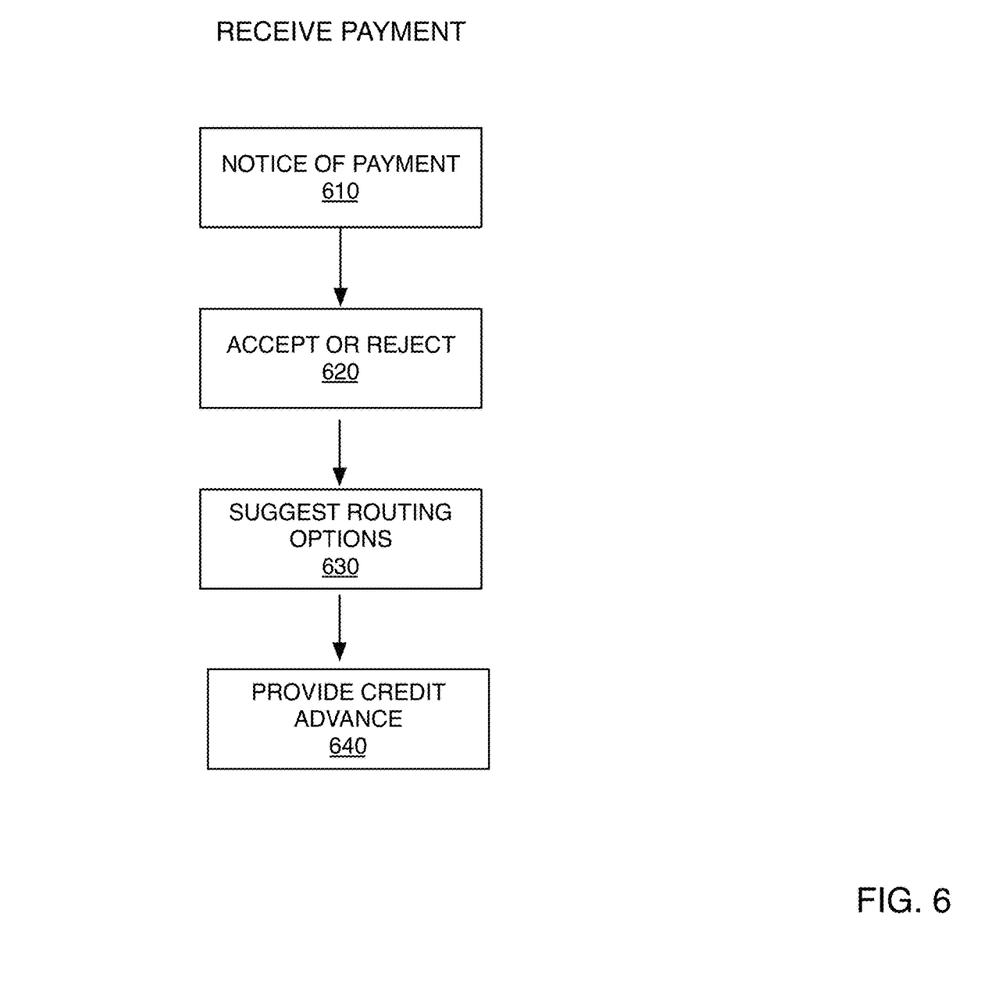
FIG. 6 is an exemplary process for receiving a payment consistent with the disclosed embodiments.

Additionally or alternatively, PPG 202 may execute instructions to perform functions related to providing promotion offers to the user (some aspects are discussed in more detail at step 630). To ensure the appropriateness of these commercial messages, messaging engine 221 may be configured to determine whether the commercial messages are desirable for a particular user or whether the particular user is likely to be responsive to the commercial messages. In some embodiments, messaging engine 221 may be configured to determine whether a user will be receptive to a particular offer by considering the user's inputs provided to interface dialog engine 211 (e.g., the user's preference for certain types of commercial messages), historic payment behavior (e.g., shopped at or ordered products from a particular retailer), information relating to membership and/or loyalty program (e.g., has a bonus membership with a retailer), activities on social networking sites (e.g., regularly checked-in on Facebook® at a certain retail location), etc.

To keep parties associated with the payment transaction updated with respect to the progress of the payment transaction, PPG 202 may execute instructions to provide mechanisms that allow the parties to be informed of the progress of the payment transaction. For example, payment status engine 223 may be configured to interact with various parties in the payment chain to determine the stage of completion of the payment transaction. In some embodiments, the payment status may be presented to the user in the form of, for example, a progress bar, text, graphics, etc. In some aspects, payment status engine 223 may provide detailed feedback with respect to the status of the payment to the parties. For example, payment status engine 223 may be configured to send a confirmation message when the payment is completed. In other aspects, information relating to payment status may be used for fraud control and overall stability of the payment option offered.

PPG 202 may execute instructions to perform other functions consistent with the disclosed embodiments. Examples of these functions may include providing a simulation environment. For instance, PPG 202 may provide a simulation environment for the user without actually requiring them to engage in a real transaction. The simulation environment may provide most of the described functions consistent with the disclosed embodiments. Another example may include providing gamification processes. For instance, PPG 202 may determine and generate incentives (both virtual and/or real) for rewarding the user for performing certain personal payment related activities, such as, for example, opening a new account. The incentives may include earning status such as, for example, a gold/silver/bronze or superstar/starlet/standing rating associated with an account. Real and virtual rewards may also be given for sharing the personal payment experience on social networking sites and recommending it to other entities or users (e.g., friends, business partners, etc.). Based on information such as, for example, user profiles and prior transaction behavior, this function may include determining whether to grant incentives and the level of incentives to be granted.

Another example is providing minimum data input process. For instance, PPG 202 may minimize the data the user has to provide. In some aspects, depending on payment rails and/or routing options chosen by the user, the process may narrow the data request to only the data necessary for the transaction. In other aspects, by integrating with the user's contact, social networking sites, and the user's phone book, the user may only be required to enter into the amount of payment and one or more of the intended payee's phone number, email address, or name to effect a payment. Additional or alternatively, by integrating historic payment behavior of both the payer and the payee, part of the information may be filled in automatically.

The disclosed embodiments may also provide constraint features. For example, PPG 202 may provide mechanisms that allow the user to set her/his preference with respect to constraints to making payments. For example, the user may choose to prevent payments from being made after a certain time (e.g. 3 a.m.) or to prevent making payments to certain payees (e.g. bars). This function may also provide some pre-set limitations or suggested limitations based on multiple inputs, such as, for example, the type of the payment, the location, the time zone of the user, and the like.

In another embodiment, PPG 202 may provide crowd sourcing and social sharing processes. For example, PPG 202 may provide mechanisms that allow the user to share her/his experience relating to making personal payment using disclosed embodiments with other individuals or entities via social networking sites or other broadcast medium.

As another example, PPG 202 may provide aggregation of feedback processes. For instance, PPG 202 may provide mechanisms that allow the user to rate, for example, his experience relating to making personal payments, using payment rails, particular routing options, or other functions consistent with the disclosed embodiments.

In another embodiment, PPG 202 may provide recurring payment processes. For example, PPG 202 may provide mechanisms that allow users to make recurring payments. This function may be performed to determine whether the payment is a one-time payment or a recurring payment. Recurring payment may either be a fixed recurring amount (for example, paying rent) or a flexible recurring amount (for example, paying utilities bills), or any other amount (e.g., a fluctuating amount).

Figure 3:
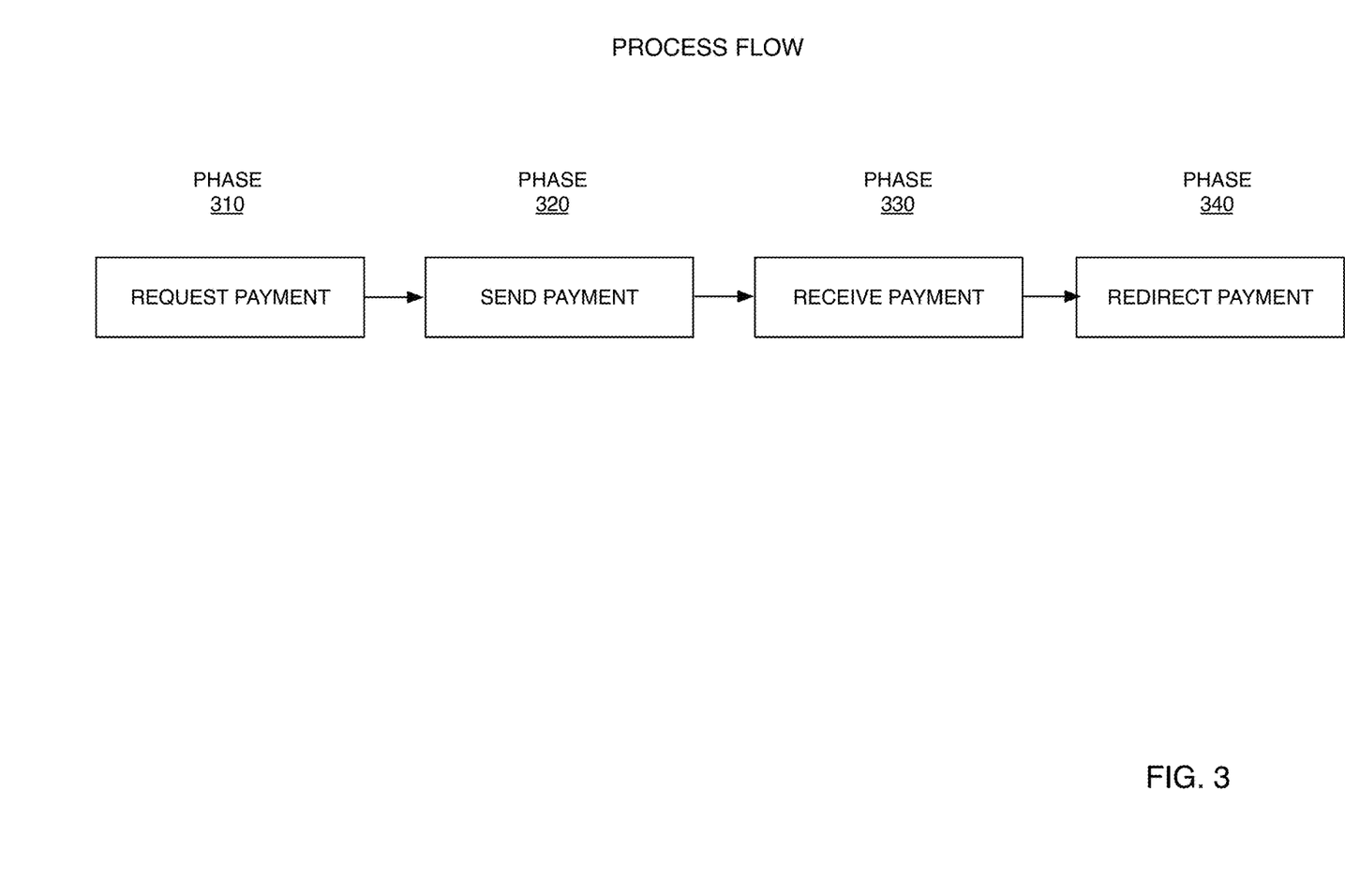
FIG. 3 is an exemplary back-end process flow for effecting a payment transaction consistent with the disclosed embodiments.

FIG. 3 illustrates a general overview of an exemplary back end process flow of PPG 202 that may be performed by the disclosed embodiments. At phase 310, PPG 202 may execute instructions to provide mechanisms that allow a payer, or a payee, or PPG 202 to initiate a payment transaction (some aspects are discussed in greater detail at FIG. 4). At phase 320, PPG 202 may execute instructions to provide mechanisms that facilitate the payer to send the payment (some aspects are discussed in greater detail at FIG. 5). At phase 330, PPG 202 may execute instructions to provide mechanisms that facilitate the payee to receive the payment (some aspects are discussed in greater detail at FIG. 6). At phase 340, PPG 202 may execute instructions to provide mechanisms that assist the payee to redirect the received payment.

Figure 4:
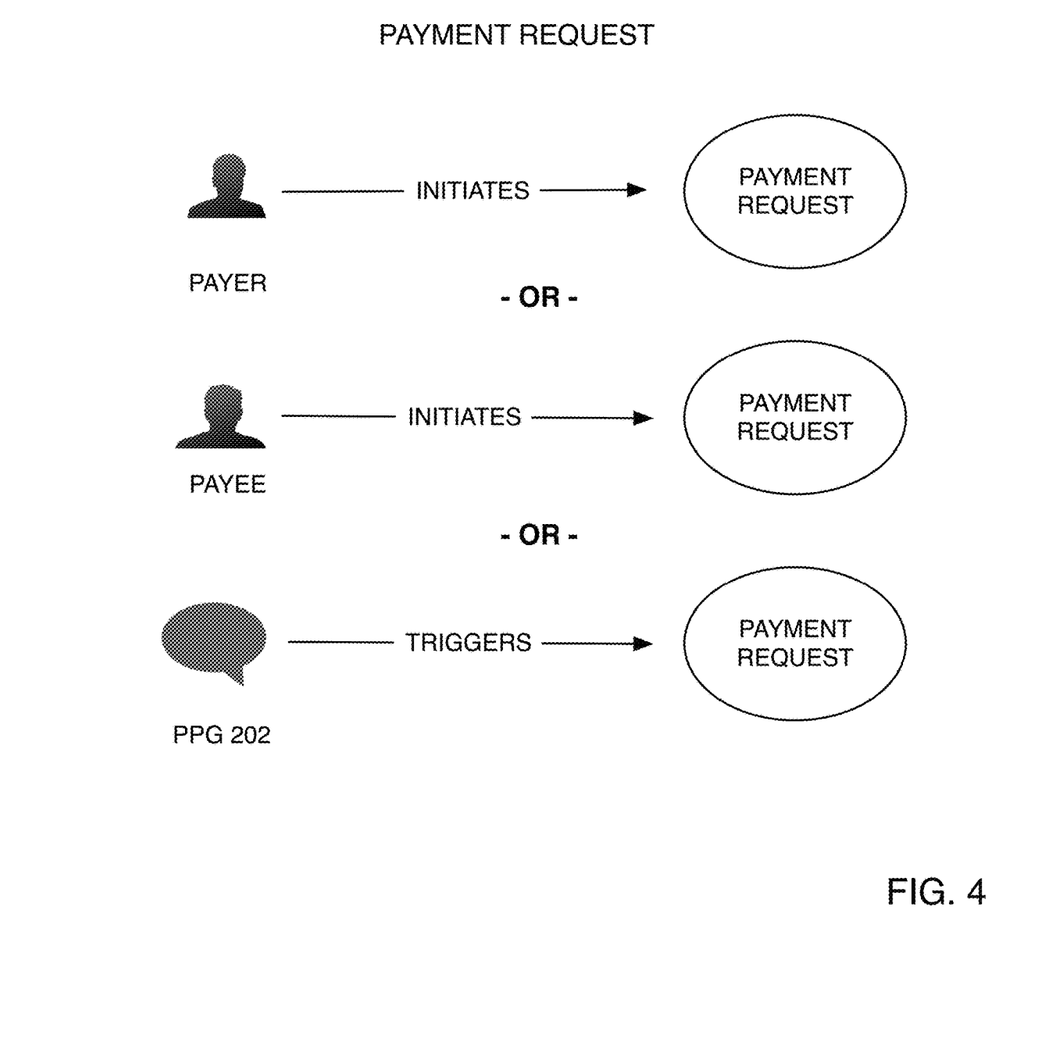
FIG. 4 is an exemplary diagram of some parties that may initiate a personal payment request consistent with the disclosed embodiments.

As illustrated in FIG. 4 according to some embodiments, PPG 202 may be configured to provide mechanisms that allow various parties to initiate a payment request.

In some embodiments, a payer may initiate a payment request. The payer may initiate the payment request from the website of financial service provider 110. Alternatively, the payer may initiate the payment request by using an application of PPG 202 downloaded into his/her computing device, preferably, a smartphone or a tablet.

In some embodiments, the payee may initiate the payment request. For example, the payee may request the payment by providing information such as, for example, the payer's name, date of request, payment amount, and reason for requesting this payment. The payee may initiate the payment request from the website of financial service provider 110. Alternatively, the payee may initiate the payment request by using the application of PPG 202 downloaded into his/her computing device, preferably, a smartphone or a tablet. To process the payment transaction initiated by the payee, PPG 202 may execute instructions to perform some aspects of the functions consistent with the disclosed embodiments for processing the payment transactions initiated by the payer. For example, payee identity engine 213 may be configured to suggest intended payers to the payee based on the payer's name provided by the payee. Routing option engine 217 may be configured to allow the payee to choose a payment rail that the payer is likely to accept. Moreover, messaging engine 221 may be configured to provide mechanisms that allow the payee to initiate parallel messages with the payer and exchange documents with the payer.

In some embodiments, PPG 202 may execute instructions to trigger a payment. For example, PPG 202 may be configured to send a reminder or a suggestion for a new payment to a payer. In some aspects, these engines/modules may be configured to obtain information from, for example, calendars, payment history, and social networking sites, or the like to identify relevant events that might warrant a payment, and determine whether to send reminders or suggestions. For example, these engines/modules may determine through a social networking site (e.g. Facebook®) that a relative of the payer has an approaching birthday, and based on this determination, a suggestion may be given to the payer to send a gift card or other type of payment to the relative as a birthday gift.

Figure 5:
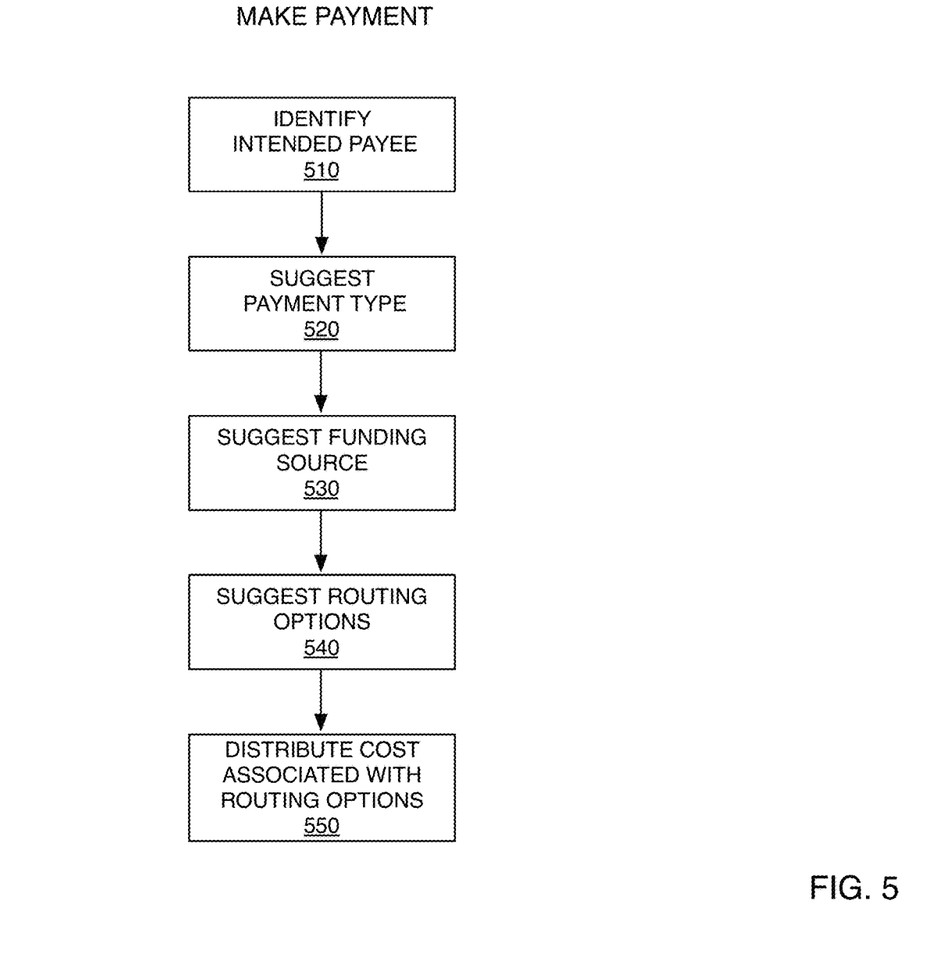
FIG. 5 is an exemplary process for sending a payment consistent with the disclosed embodiments.

As illustrated in FIG. 5 according to some embodiments, PPG 202 may be configured to execute instructions to facilitate the payer to send the payment. To facilitate the payer to send the payment in a flexible and convenient way, PPG 202 may be configured to perform functions including, for example, identifying the intended payee by requesting minimum input from the payer (step 510), suggesting payment type (step 520), suggesting funding source to fund the payment (step 530), suggesting routing source to rail the payment (step 540), and providing mechanism that allow the payer to distribute cost associated with certain routing options (step 550).

At step 510, based on some input from the payer with respect to his/her intended payee (e.g. payee's name), payee identity engine 213 (some aspects of its functions were discussed in greater detail above) may be configured to provide some suggested recipients that could potentially be the payee, together with further information for the payer to identity the payee (e.g. suggested recipients' addresses and/or phone numbers and/or ages, level of confidence, data sources used). The payer thus may identity his/her intended payee based on this information. Additionally or alternatively, the payer may also provide feedback to PPG 202 if the intended payee is not included in the suggested recipients.

At step 520, PPG 202 may execute instructions to allow the payer to select a payment type. In some embodiment, if the payer initially chooses to send the payment by cash and enters into the amount of money he/she wants to transfer, PPG 202 may be configured to provide alternative payment types (e.g. sending a gift card instead of money). In some embodiments, based on the information about the intended payee and the payment type, PPG 202 may be configured to determine whether the payment is for a particular purpose, such as, the intended payee's birthday. If the particular purpose is confirmed, PPG 202 may be configured to execute instructions to perform functions consistent with the disclosed embodiments such as, for example, suggesting alternative payment type (e.g. purchase of an item appearing on the "wish list" of an online account associated with the payee), allowing the payer to send a birthday card or upload a picture or a video together with the payment.

At step 530, PPG 202 may be configured to perform functions that enable the payer to choose a funding source to fund his/her payment. In some embodiments, funding source engine 215 (some aspects were discussed in greater detail above) may be configured to determine available funding sources to make the payment, which may be internal and/or external to financial service provider 110. In other embodiments, funding source engine 215 may be configured to estimate preferred source(s) of funds and determine which one(s) to suggest to the payer.

At step 540, PPG 202 may also be configured to provide mechanisms that allow the payer to select a rail to route his/her payment. In some embodiments, routing option engine 217 of PPG 202 (some aspects were discussed in greater detail above) may be configured to suggest routing options by considering factors including, for example, type of payment, available information of an intended payee, location of the payee, transaction history, the payer or the intended payee's preferred routing options, etc. In some embodiments, routing option engine 217 may be configured to rank the suggested routing options by multiple parameters such as, for example, safety, speed, cost, stability, history (e.g., customer experience), and etc. Additionally or alternatively, PPG 202 may be configured to provide mechanisms that allow the payer and the payee to communicate with each other during the process of making the payment, and thus, the payer may learn of the payee's preferred routing option(s) via communication with the payee and may accordingly choose the routing option for the payment.

In some embodiments, certain routing options may involve some cost, and in these situations, PPG 202 may be configured to suggest routing options based on such considerations as well. And, once a particular routing option involving cost is selected, PPG 202 may be configured to determine how to distribute the cost associated with the routing option at step 550. In some aspects, the payer may choose a way to distribute the cost. For example, the payer may bear the cost on his/her own, share the cost with the payee, or choose to have the payee to bear the cost. In other aspects, PPG 202 may be configured to provide mechanisms that allow the payer to prohibit the use of certain routing option(s) involving cost.

As illustrated in FIG. 6 according to some embodiments, PPG 202 may be configured to execute instructions to process the receipt of the payment. To assist the payee in receiving the payment in a flexible and timely manner, PPG 202 may be configured to perform functions including, for example, sending a notice to the payee informing him/her of the incoming payment (step 610), providing the payee with the option to reject or accept the payment (step 620), suggesting routing options to receive the payment (step 630), and providing the option of receiving the payment immediately if the selected routing option has a wait time to deliver the payment (step 640).

At step 610, PPG 202 may be configured to provide a notice to the payee informing him/her of the incoming payment consistent with some embodiments. In some embodiments, messaging engine 221 may be configured to determine the appropriate medium or media to deliver the notification to the payee (or a payer if the payee initiates the payment request). Based on the determination, PPG 202 may execute software that delivers the notice to the payee and/or the payer via one or more media including, for example, text messages, email, or social networking sites (e.g., Facebook®, Twitter, etc.). If the payer or the payee is a user of PPG 202, PPG 202 may execute software that delivers the notice directly to client 114.

At step 620, PPG 202 may be configured to perform mechanisms that allow the payee to either accept or reject the incoming payment according to some embodiments. In some aspects, PPG 202 may be configured to provide mechanisms that allow the payee to provide reasons for rejecting the incoming payment, which may include, for example, the payment amount is incorrect.

At step 630, once the payee accepts the payment, PPG 202 may be configured to provide the payee with routing options for receiving the payment according to some embodiments. In some embodiments, routing option engine 217 of PPG 202 (some aspects were discussed in greater detail above) may be configured to suggest routing options by considering factors including, for example, type of payment, available information of an intended payee, location of the payee, transaction history, the payer or the intended payee's preferred routing options, and the like. In some embodiments, routing option engine 217 may rank suggested options by multiple parameters such as, for example, safety, speed, cost, stability, history (e.g., customer experience), etc. In other embodiments, routing option engine 217 may be configured to determine which rails are best fits for the payee and which rails should be offered to the payee.

Additionally or alternatively, to assist the payee to select the routing option, PPG 202 may be configured to provide commercial messages to the payee associated with one or more routing options. For example, if a routing option requires the payee to open a new bank account with financial service provide 110, the payee may receive some commercial message relating to the incentives to open a new bank account. Messaging engine 221 of PPG 202 (some aspects were discussed in greater detail above) may be configured to determine what message to display to the payee. The determination may be based on the occasion and the type of the payment, among other considerations.

Depending on the selected routing option, the payee may not receive immediate payment. For example, if the payer deposits some money directly into the payee's bank account, the payee may not withdraw or use the payment immediately. At step 640, credit decision engine 219 of PPG 202 (some aspects were discussed above) may be configured to determine whether the payee is willing and eligible for credit advance. And credit decision engine 219 may be configured to provide mechanisms that allow the payee to apply credit advance once the determination is made.

In some embodiments, PPG 202 may execute instructions to facilitate the payee to redirect the received payment to another recipient. In these situations, the payee may act as the payer. For example, PPG 202 may be configured to determine available allocating options to redirect a received payment of the payee (some aspects were discussed in greater detail above). In some embodiments, if the payee received a gift card, the payer may receive some commercial message relating to the incentive (e.g. receive a discount) to use the payment with certain vendors.

Figure 7A:
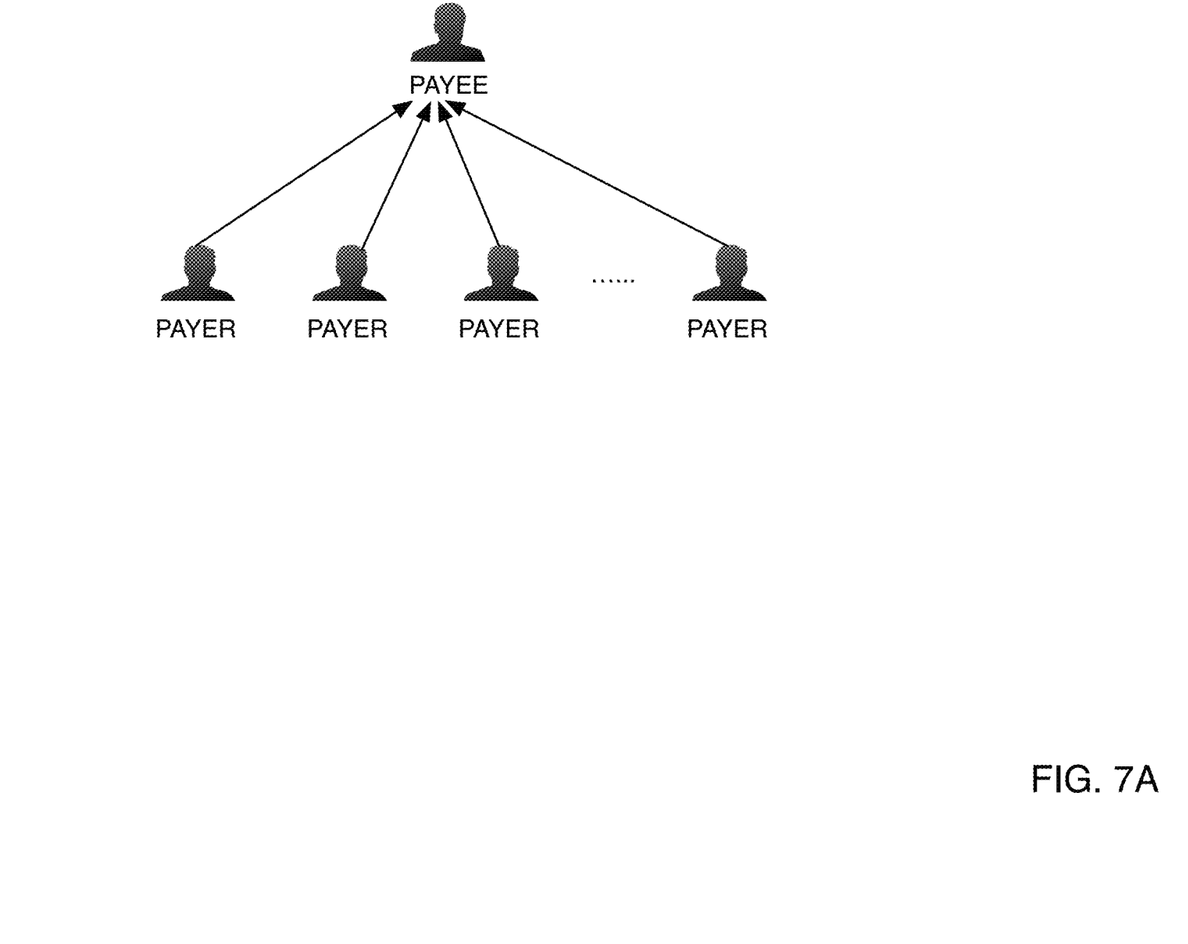
FIG. 7A is an example group payment scenario consistent with disclosed embodiments.
Figure 7B:
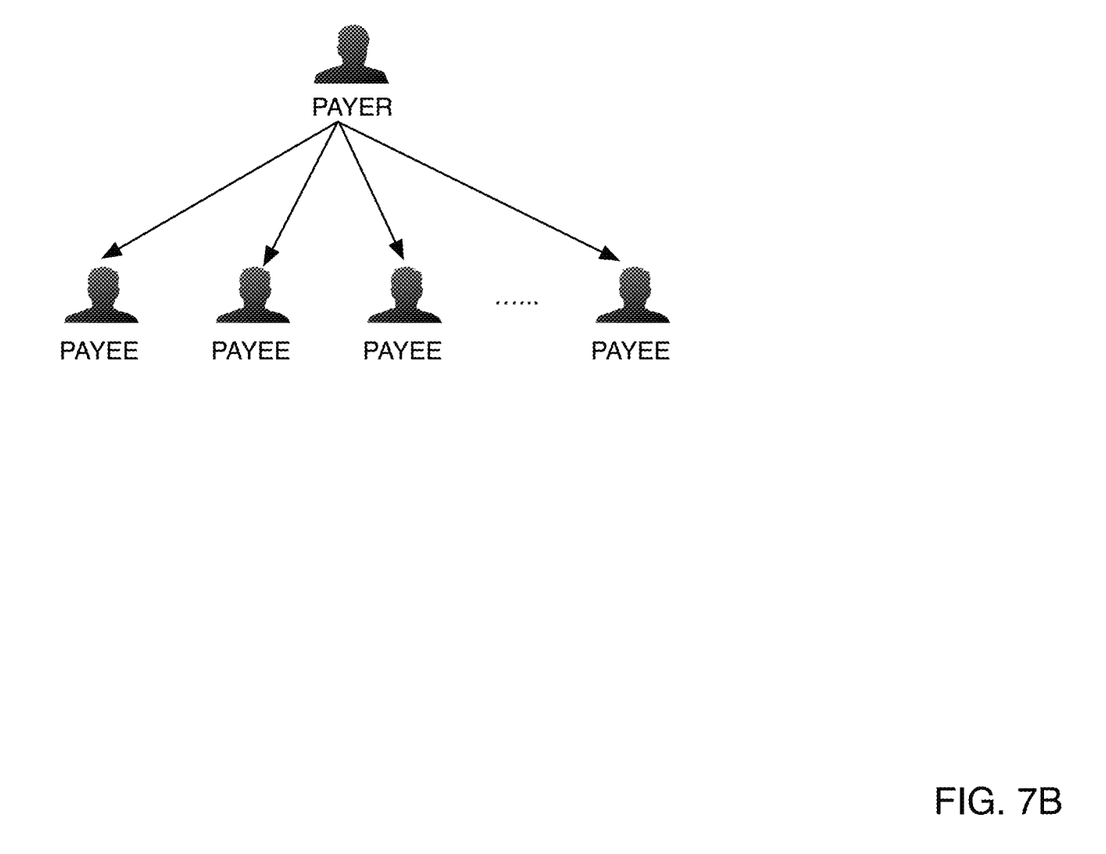
FIG. 7B is an exemplary group payment scenario consistent with the disclosed embodiments.

As illustrated in FIG. 7A according to some embodiments, PPG 202 may be configured to allow the user to make multiple-party payment transactions. In some aspects, the user may share his/her payment request with the rest of the group. PPG 202 may be configured to process the received payments and combine the funds into a single transaction to the payee. In other aspects, PPG 202 may also be configured to perform functions that enable the user to collect money from parties for various other purposes. For example, the user may use PPG 202 to raise fund for a charity. In another example, PPG 202 may also perform functions that enable the user to run an office pool to raise funds for various purposes. These embodiments may provide options to treat the payer(s) as an individual or as a group. Additionally or alternatively, as shown in FIG. 7B according to some embodiments, PPG 202 may be configured to provide mechanisms that allow the user to make payment to multiple payees.

Figure 8A:
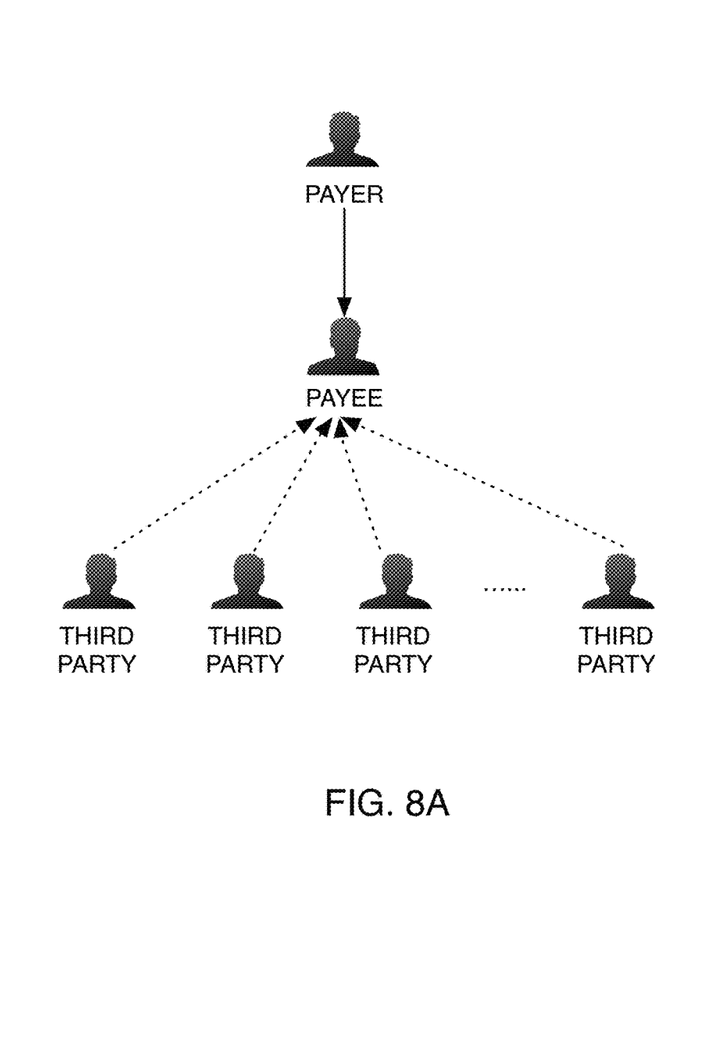
FIG. 8A is an exemplary third party payment scenario consistent with the disclosed embodiments.
Figure 8B:
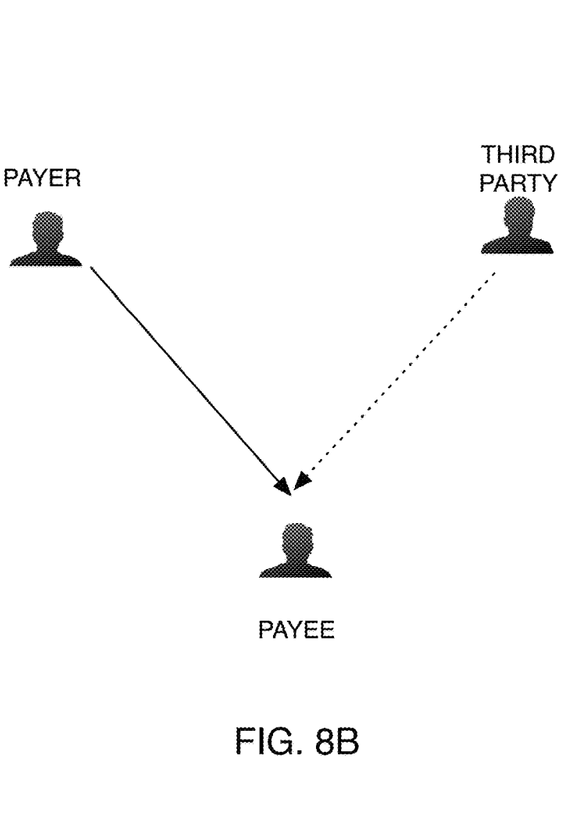
FIG. 8B is an exemplary third party payment scenario consistent with the disclosed embodiments.

As illustrated in FIG. 8A and 8B according to some embodiments, PPG 202 may be configured to perform functions that allow the payer to make a payment on behalf of other parties. In some aspects, as illustrated in FIG. 8A, a payer may choose to make the payment for parties within a certain geographic vicinity of the payer. For example, the payer may buy beers for everyone within ten feet of the user at a bar. PPG 202 determine the identity of individuals within a certain geographic vicinity based on various sources including, for example, GPS data or information from social networking websites. In other aspects, as illustrated in FIG. 8B, a payer may make a payment on behalf of a third party indirectly by predetermining a payee. For example, if parents (the payer) pay the rent on behalf of their child (third party), the child may not have any options in terms of changing the payee, the amount, and the like, but only have the option to approve the transaction.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

What is claimed is:

1. A system for providing online personal payment transactions between at least one of multiple payers or multiple payees, the system comprising:
   at least one storage device storing instructions; and
   at least one processor executing the instruction to perform operations comprising:
   determining a technical experience level for a first selected one of the payers;
   generating a dynamically determined interface for a payer device, associated with the first selected payer, for effecting a personal payment transaction comprising a first payment, wherein:

the interface contains a first number of function when the technical experience level is less than or equal to a first value;
the interface contains a second number of function when the technical experience level is greater than the first level, the second number of function being greater than the first number of function; and
the payer device initiates the first payment at a web browser of the interface for receipt by a selected one of the payees;
receiving from the first selected payer, via the interface, identifying information about the selected payee;
determining a plurality of candidate payees based on:
the identifying information; and
data collected from an electronic network, the data comprising at least one of a social networking profile, a website user account, white pages, or checking account profile information;
determining confidence level for the candidate payees, the confidence level indicating likelihoods that the candidate payees represent the selected payee;
determining ranks for the determined confidence level;
displaying the candidate payees according to the ranks of confidence level;
receiving a confirmation of which of the candidate payees constitute the selected payee;
providing, based on the confirmation to the first selected payer via the interface, options to fund the first payment to the selected payee;
providing options to the first selected payer and the selected payee for routing the payment, the options being ranked according to multiple parameters;
providing a channel for the first selected payer and the selected payee to communicate an electronic message using the system;
providing, via the interface, one or more pre-set limitations associated with processing the transaction based on multiple associated with the interface;
combining the first payment, over the electronic network, with a second payment of a second selected one of the payers involved in the processed payment transaction to the selected payee;
determining, based on the combination of payment, a content of the electronic message, wherein the electronic message comprises at least one of multimedia or interactive content; and
displaying the electronic message via the interface to at least one of the first selected payer or the selected payee.

2. The system of claim 1, wherein the operation comprise providing a status of the transaction.

3. The system of claim 1, wherein the operation comprise receiving input from the first selected payer via voice commands.

4. The system of claim 1, wherein the operation comprise providing one or more incentives for performing activities associated with the personal payment transaction.

5. A computer-implemented method for facilitating online personal payment transactions between at least one of multiple payers or multiple payees, comprising:
determining a technical experience level for a first selected one of the payers;
generating, by one or more processors, a dynamically determined interface for a payer device, associated with the first selected payer, for effecting a personal payment transaction comprising a first payment, wherein:
the interface contains a first number of function when the technical experience level is less than or equal to a first value;
the interface contains a second number of function when the technical experience level is greater than the first level, the second number of functions being greater than the first number of functions; and
the payer device initiates the first payment at a web browser or the interface for receipt by a selected one or the payees;
receiving from the first selected payer, via the interface, identifying information about the selected payee;
determining a plurality of candidate payees based on;
the identifying information; and
data collected from an electric network, the data comprising at least one of a social networking profile, a website user account, white pages, or checking account profile information;
determining confidence levels for the candidate payees, the confidence level indicating likelihoods that the candidates payees, represent the selected payee;
determining ranks for the determined confidence levels;
displaying the candidate payees according to the ranks of confidence level;
receiving a confirmation of which of the candidate payees constitute the selected payee;
providing, based on the confirmation to the first selected payer via the interface, option to fund the first payment to the selected payee;
providing option to the first selected payer and the selected payee for routing the payment, the option being ranked according to multiple parameters;
providing a channels for the first selected payer and the selected payee to communicate an electric message using the system;
providing, via the interface, one or more pre-set limitations associated with processing the transaction based on multiple inputs associated with the interface;
combining the first payment, over the electric network, with a second payment of a second selected one of the payers involved in the processed payment transaction to the selected payee;
determining, based on the combination of payments, a content of the electric message, wherein the electric message comprises at least one of multimedia or interactive content; and
displaying the electric message via the interface to at least one of the first selected payer or the selected payee.

6. The method of claim 5, further comprising:
providing, via the interface, a status of the transaction.

7. The method of claim 5, further comprising:
receiving, via the interface, input from the first selected payer via voice commands.

8. The method of claim 5, further comprising:
providing one or more incentives for performing activities associated with the personal payment transaction.

9. A non-transitory computer readable medium storing instructions that, when executed by a processor, cause the processor to perform operation comprise:
determining a technical experience level for a first selected one of the payers;
generate, by one or more processors, a dynamically determined interface for a payer device, associated with the first selected payer, for effecting a personal payment transaction comprising a first payment, wherein:

the interface contains a first number of function when the technical experience level is less than or equal to a first value;

the interface contains a second number of function when the technical experience level is greater than the first level, the second number of function being greater than the first number of function; and the payer device initiates the first payment at a web browser of the interface for receipt by a selected one of the payees;

receiving from the first selected payer, via the interface, identifying information about the selected payee;

determining a plurality of candidate payees based on:
    the identifying information; and
    data collected from an electronic network, the data comprising at least one of a social networking profile, a website user account, white pages, or checking account profile information;

determining confidence levels for the candidate payees, the confidence levels indicating likelihoods that the candidate payees represent the selected payee;

determining ranks for the confidence levels;

displaying the candidate payees according to the ranks of confidence level;

receiving a confirmation of which of the candidate payees constitute the selected payee;

providing, based on the conformation to the first selected payer via the interface, options to fund the first payment to the selected payee;

providing options to the first selected payer and the selected payee for routing the payment, the options being ranked according to multiple parameters;

providing a channel for the first selected payer and the selected payee to communicate an electronic message using the system;

providing, via the interface, one or more pre-set limitation associated with processing the transaction base on multiple inputs associated with the interface;

combining the first payment over the electronic network, with a second payment of a second selected one of the payers involved in the processed payment transaction to the selected payee;

determining, based on the combination of payments, a content of the electronic message, wherein the electronic message comprises at least one of multimedia or interactive content; and displaying, the electronic message via the interface to at least one of the first selected payer or the selected payee.

10. The method of claim 9, wherein the operations comprise providing, via the interface, a status of the transaction.

11. The medium of claim 9, wherein the operations comprise
    receiving, via the interface, input from the first selected payer via voice commands.

12. The method of claim 9, wherein the operations comprise
    providing one or more incentives for performing activities associated with the personal payment transaction.

* * * * *

UNITED STATES PATENT AND TRADEMARK OFFICE
CERTIFICATE OF CORRECTION

PATENT NO. : 10,354,237 B2
APPLICATION NO. : 14/108926
DATED : July 16, 2019
INVENTOR(S) : Gagan Kanjlia et al.

Page 1 of 1

It is certified that error appears in the above-identified patent and that said Letters Patent is hereby corrected as shown below:

In the Claims

Claim 1, Column 15, Line 44, "payment," should read as --payments,--.

Claim 2, Column 15, Line 51, "operation" should read as --operations--.

Claim 3, Column 15, Line 53, "operation" should read as --operations--.

Claim 4, Column 15, Line 56, "operation" should read as --operations--.

Claim 5, Column 16, Line 13, "on;" should read as --on:--.

Claim 5, Column 16, Line 22, "payees, represent" should read as --payees represent--.

Claim 9, Column 18, Line 7, "base on" should read as --based on--.

Claim 9, Column 18, Line 17, "displaying, the" should read as --displaying the--.

Signed and Sealed this
Twenty-fourth Day of December, 2019

Andrei Iancu
*Director of the United States Patent and Trademark Office*